(12) United States Patent
Onikubo et al.

(10) Patent No.: US 12,507,868 B2
(45) Date of Patent: Dec. 30, 2025

(54) ENDOSCOPE SYSTEM, ENDOSCOPE CONTROL METHOD, AND PROGRAM WITH HYSTERESIS COMPENSATION FOR AUTOFOVUS CONTROL

(71) Applicant: Sony Group Corporation, Tokyo (JP)

(72) Inventors: Masatoshi Onikubo, Tokyo (JP); Takashi Kawai, Tokyo (JP)

(73) Assignee: Sony Group Corporation, Tokyo (JP)

( * ) Notice: Subject to any disclaimer, the term of this patent is extended or adjusted under 35 U.S.C. 154(b) by 449 days.

(21) Appl. No.: 18/003,501

(22) PCT Filed: Jul. 2, 2021

(86) PCT No.: PCT/JP2021/025085
§ 371 (c)(1),
(2) Date: Dec. 28, 2022

(87) PCT Pub. No.: WO2022/014366
PCT Pub. Date: Jan. 20, 2022

(65) Prior Publication Data
US 2023/0240515 A1 Aug. 3, 2023

(30) Foreign Application Priority Data
Jul. 17, 2020 (JP) ................. 2020-122579

(51) Int. Cl.
*A61B 1/00* (2006.01)
*G02B 23/24* (2006.01)

(52) U.S. Cl.
CPC ...... *A61B 1/00096* (2013.01); *A61B 1/00006* (2013.01); *G02B 23/2438* (2013.01); *G02B 23/2461* (2013.01); *G02B 23/2484* (2013.01)

(58) Field of Classification Search
None
See application file for complete search history.

(56) References Cited

U.S. PATENT DOCUMENTS

2005/0281551 A1 12/2005 Ono
2015/0237254 A1 8/2015 Chino
(Continued)

FOREIGN PATENT DOCUMENTS

JP 61-116342 A 6/1986
JP 9-247517 A 9/1997
(Continued)

OTHER PUBLICATIONS

International Search Report and Written Opinion mailed on Sep. 28, 2021, received for PCT Application PCT/JP2021/025085, filed on Jul. 2, 2021, 8 pages including English Translation.

*Primary Examiner* — John P Leubecker
(74) *Attorney, Agent, or Firm* — XSENSUS LLP

(57) ABSTRACT

The present technology relates to an endoscope system, an endoscope control method, and a program that allow AF processing to be performed without deterioration in accuracy. Provided are a drive unit that drives a lens, a measurement unit that measures a position of the lens, and a control unit that controls focusing, the control of the focusing including setting a control amount of wobbling at the time of the focusing based on a first hysteresis that is stored and a second hysteresis that is measured upon energization. The present technology is applicable to a medical observation device such as an endoscope or a microscope.

20 Claims, 7 Drawing Sheets

(56) References Cited

U.S. PATENT DOCUMENTS

2015/0334289 A1* 11/2015 Yoshino ............... H04N 23/673
                                                                    348/353
2017/0265726 A1*  9/2017 Mikami ............... H04N 23/675
2020/0154986 A1*  5/2020 Shimoyama ....... A61B 1/00158

FOREIGN PATENT DOCUMENTS

| JP | 2006-3577 A   | 1/2006  |
|----|---------------|---------|
| JP | 2014-235226 A | 12/2014 |
| JP | 2015-152817 A | 8/2015  |
| JP | 2017-6330 A   | 1/2017  |

* cited by examiner

NDOSCOPE SYSTEM, ENDOSCOPE CONTROL METHOD, AND PROGRAM WITH HYSTERESIS COMPENSATION FOR AUTOFOVUS CONTROL

CROSS-REFERENCE TO RELATED APPLICATIONS

The present application is based on PCT filing PCT/JP2021/025085, filed Jul. 2, 2021, which claims priority to JP 2020-122579, filed Jul. 17, 2020, the contents of each are incorporated in entirety by reference.

TECHNICAL FIELD

The present technology relates to an endoscope system, an endoscope control method, and a program, and specifically relates to an endoscope system, an endoscope control method, and a program suitable for use in, for example, auto focus (AF) at the time of capturing an image of the inside of a living body.

BACKGROUND ART

In a medical observation device such as an endoscope or a microscope, the operative field often has a depth greater than a depth of field of the medical observation device, so that it may take time to focus on a place desired to be visually confirmed. On the other hand, a medical observation device having an AF function of automatically adjusting the focus has been proposed (see, for example, Patent Document 1).

CITATION LIST

Patent Document

Patent Document 1: Japanese Patent Application Laid-Open No. 2017-6330

SUMMARY OF THE INVENTION

Problems to be Solved by the Invention

A medical observation device such as an endoscope or a microscope is sterilized under an environment such as high pressure and high temperature called an autoclave. There has been a possibility that, for example, characteristics of a camera head of the endoscope change due to the autoclave. Furthermore, there has been a possibility that stable AF processing fails to be performed due to a change in characteristics of the camera head, specifically, characteristics of an actuator.

The present technology has been made in view of such circumstances, and it is therefore an object of the present technology to allow stable AF processing to be performed.

SOLUTIONS TO PROBLEMS

An endoscope system according to one aspect of the present technology includes a drive unit that drives a lens, a measurement unit that measures a position of the lens, and a control unit that controls focusing, and the control of the focusing includes setting a control amount of wobbling at the time of the focusing on the basis of first hysteresis that is held and second hysteresis that is measured upon energization.

An endoscope control method of an endoscope system according to one aspect of the present technology, the endoscope system including a drive unit that drives a lens, a measurement unit that measures a position of the lens, and a control unit that controls focusing, includes setting, by the control unit, a control amount of wobbling at the time of the focusing on the basis of first hysteresis that is held and second hysteresis that is measured upon energization, and controlling, by the control unit, the focusing on the basis of the control amount.

A program according to one aspect of the present technology causes a computer to perform a process, the computer being configured to control an endoscope system, the endoscope system including a drive unit that drives a lens, a measurement unit that measures a position of the lens, and a control unit that controls focusing, the process including setting a control amount of wobbling at the time of the focusing on the basis of first hysteresis that is held and second hysteresis that is measured upon energization, and controlling the focusing on the basis of the control amount.

In the endoscope system, the endoscope control method, and the program according to one aspect of the present technology, the focusing is controlled by driving the lens to measure the position of the lens. The control of the focusing is performed by setting the control amount of wobbling at the time of the focusing on the basis of the first hysteresis that is held and the second hysteresis that is measured upon energization.

Note that the endoscope system may be an independent device or an internal block constituting a part of one device.

Furthermore, the program can be provided by being transmitted via a transmission medium or by being recorded on a recording medium.

MODE FOR CARRYING OUT THE INVENTION

Hereinafter, modes for carrying out the present technology (hereinafter, referred to as embodiments) will be described.

The present technology described below is applicable to a medical observation device such as an endoscope or a microscope configured to perform auto focus (AF) processing. Furthermore, the present technology is also applicable to a device such as an imaging device other than the medical observation device, the device being configured to perform AF processing. In the following description, a case where the present technology is applied to an endoscope will be described as an example, but the present technology is also applicable to devices other than the endoscope.

<Configuration Example of Imaging System>

Figure 1:
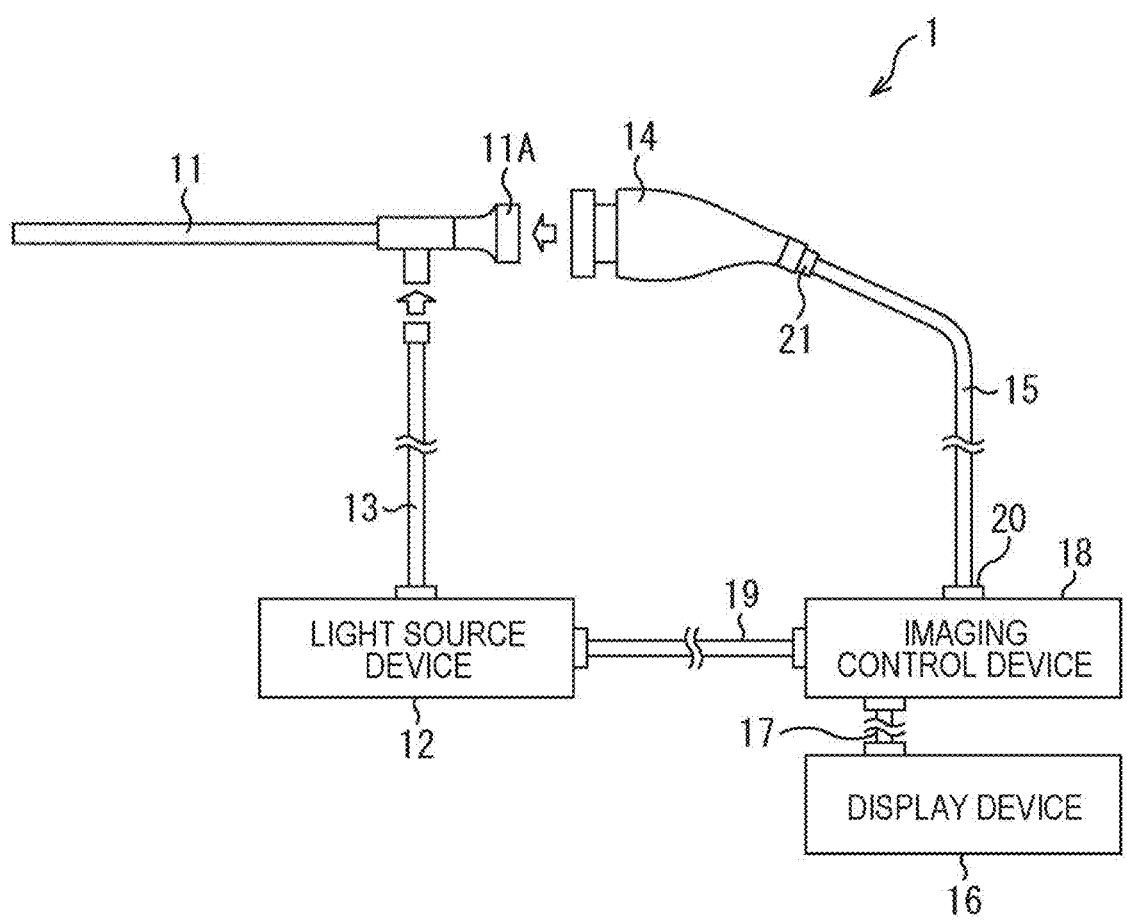
FIG. 1 is a block diagram illustrating an embodiment of an imaging system to which the present technology is applied.

FIG. 1 illustrates a configuration example of an imaging system 1 to which the present technology is applied.

The imaging system 1 is, for example, an endoscope system used in the medical field, and is used to capture an image of and make observations of the inside of a living body. The imaging system 1 includes an insertion unit 11, a light source device 12, a light guide 13, a camera head (imaging unit) 14, a first transmission cable 15, a display device 16, a second transmission cable 17, an imaging control device 18, a third transmission cable 19, a connector 20, and a connector 21.

The insertion unit 11 is a scope, such as a rigid scope for a rigid endoscope, and a flexible scope (for example, a fiberscope) for a flexible endoscope. That is, the insertion unit 11 is a member that is rigid or at least partially flexible, has an elongated shape, and is inserted into a living body. The insertion unit 11 is provided with an optical system that includes one or a plurality of lenses and collects a subject image. Note that the insertion unit 11 and the camera head 14 may be inseparable from each other. In a case of a flexible scope, a configuration where an imaging element is be disposed in the vicinity of a distal end of the insertion unit 11 may be employed.

The light source device 12 is connected to one end of the light guide 13, and supplies light for illuminating the inside of the living body to the one end of the light guide 13 under the control of the imaging control device 18.

The light guide 13 has the one end detachably connected to the light source device 12 and the other end detachably connected to the insertion unit 11. Then, the light guide 13 transmits the light supplied from the light source device 12 from the one end to the other end to supply the light to the insertion unit 11. The light supplied to the insertion unit 11 is output from the distal end of the insertion unit 11 to illuminate the inside of the living body. The light (subject image) that illuminates the inside of the living body and is then reflected off the inside of the living body is collected by the optical system in the insertion unit 11.

The camera head 14 is detachably connected to an eyepiece 11A that is a proximal end of the insertion unit 11. Then, the camera head 14 captures, under the control of the imaging control device 18, the subject image collected by the insertion unit 11, and outputs an image signal (RAW signal) generated as a result of the capture. The image signal is, for example, an image signal of 4K or higher.

Note that an image based on the image signal is hereinafter referred to as a captured image.

The first transmission cable 15 has one end detachably connected to the imaging control device 18 via the connector 20 and the other end detachably connected to the camera head 14 via the connector 21. Then, the first transmission cable 15 transmits the image signal or the like output from the camera head 14 to the imaging control device 18, and transmits a control signal, a synchronization signal, a clock signal, power, and the like output from the imaging control device 18 to the camera head 14. The connector 20 or the connector 21 may be provided with a memory to store a parameter related to a structure or an imaging condition of the camera head 14.

Note that the image signal or the like transmitted from the camera head 14 to the imaging control device 18 through the first transmission cable 15 may be either an optical signal or an electrical signal. The same applies to the control signal, the synchronization signal, and the clock signal transmitted from the imaging control device 18 to the camera head 14 through the first transmission cable 15. Furthermore, the camera head 14, the connector 21, the first transmission cable 15, and the connector 20 may be collectively referred to as a camera head or an endoscope. Furthermore, the insertion unit 11 and the camera head 14 may be collectively referred to as an endoscope.

The display device 16 displays, under the control of the imaging control device 18, a display image based on a video signal from the imaging control device 18.

The second transmission cable 17 has one end detachably connected to the display device 16 and the other end detachably connected to the imaging control device 18. Then, the second transmission cable 17 transmits the video signal processed by the imaging control device 18 and the control signal output from the imaging control device 18 to the display device 16.

The imaging control device 18 includes, for example, a camera control unit (CCU) including a central processing unit (CPU) and the like. The imaging control device 18 is responsible for centralized operation control of the light source device 12, the camera head 14, and the display device 16.

The third transmission cable 19 has one end detachably connected to the light source device 12 and the other end detachably connected to the imaging control device 18. Then, the third transmission cable 19 transmits the control signal from the imaging control device 18 to the light source device 12.

<Configuration Example of Camera Head, Display Device, and Imaging Control Device>

Next, configuration examples of the camera head 14, the display device 16, and the imaging control device 18 will be described with reference to FIG. 2.

Note that, in FIG. 2, for convenience of description, no illustration will be given of the connector 20 and the connector 21 between the imaging control device 18 and the first transmission cable 15 and between the camera head 14 and the first transmission cable 15, and connectors between the imaging control device 18 and the second transmission cable 17 and between the display device 16 and the second transmission cable 17.

The camera head 14 includes a lens unit 51, a lens drive unit 52, a lens position detection unit 53, an imaging processing unit 54, a communication unit 55, an inertial measurement unit (IMU) 56, and an input unit 57.

The lens unit 51 includes a plurality of lenses movable along an optical axis, and forms the subject image collected by the insertion unit 11 on an imaging surface of the imaging processing unit 54. The lens unit 51 includes a focus lens 61 and a zoom lens 62.

The focus lens 61 includes one or a plurality of lenses, and moves along the optical axis to adjust focus of the camera head 14.

The zoom lens 62 includes one or a plurality of lenses, and moves along the optical axis to adjust an angle of view of the camera head 14.

The lens unit 51 further includes a focus mechanism (not illustrated) that moves the focus lens 61 along the optical axis and an optical zoom mechanism (not illustrated) that moves the zoom lens 62 along the optical axis.

The lens drive unit 52 includes an actuator 71 that operates the focus mechanism and the optical zoom mechanism described above, and a driver 72 that drives the actuator 71. Then, the lens drive unit 52 adjusts the focus and angle of view of the lens unit 51 under the control of the imaging control device 18.

The lens position detection unit 53 includes a position sensor such as a photo interrupter, and detects a position of the focus lens 61 (hereinafter, referred to as a focus position) and a position of the zoom lens 62 (hereinafter, referred to as a zoom position). Then, the lens position detection unit 53 outputs a detection signal based on the focus position and the zoom position to the imaging control device 18 through the first transmission cable 15.

The imaging processing unit 54 includes a sensor chip in which an imaging element (not illustrated), a signal processing unit (not illustrated), and the like are integrally mounted. The imaging element includes, for example, a charge coupled device (CCD), a complementary metal oxide semiconductor (CMOS), or the like that receives the subject image collected by the insertion unit 11 and formed by the lens unit 51, and converts the subject image into an electrical signal. The signal processing unit performs signal processing (A/D conversion or the like) on the electrical signal (analog signal) from the imaging element and outputs an image signal. The imaging processing unit 54 captures an image of the inside of the living body under the control of the imaging control device 18, and outputs the image signal (digital signal) obtained as a result of the A/D conversion.

Note that the signal processing unit described above need not necessarily be integrally mounted with the imaging element and may be separate from the imaging element.

The communication unit 55 functions as a transmitter that transmits the image signal output from the imaging processing unit 54 to the imaging control device 18 through the first transmission cable 15. The communication unit 55 includes, for example, a high-speed serial interface that communicates the image signal at a transmission rate of 1 Gbps or more with the imaging control device 18 through the first transmission cable 15.

The IMU 56 detects acceleration and angular velocity of the camera head 14, and supplies a detection signal indicating a result of the detection to the imaging control device 18.

The input unit 57 includes an operation device such as a button, a switch, or a touchscreen, and receives a user's operation. The input unit 57 supplies an input signal input according to the user's operation to the imaging control device 18.

The imaging control device 18 includes a communication unit 101, a signal processing unit 102, a display control unit 103, a control unit 104, an input unit 105, an output unit 106, and a storage unit 107.

The communication unit 101 functions as a receiver that receives the image signal output from the camera head 14 (communication unit 55) through the first transmission cable 15. The communication unit 101 includes, for example, a high-speed serial interface that communicates the image signal with the communication unit 55 at a transmission rate of 1 Gbps or more.

The signal processing unit 102 performs, under the control of the control unit 104, various types of processing on the image signal (RAW signal) output from the camera head 14 (communication unit 55) and received by the communication unit 101. The signal processing unit 102 includes an image processing unit 111, a detection processing unit 112, a position estimation unit 113, a distance measurement unit 114, and an image recognition unit 115.

The image processing unit 111 performs RAW processing such as optical black subtraction processing and demosaicing processing on the image signal (RAW signal) received by the communication unit 101 to convert the RAW signal (image signal) into an RGB signal (image signal). Furthermore, the image processing unit 111 performs RGB processing such as white balance, RGB gamma correction, and YC conversion (conversion of the RGB signal into luminance signal and color difference signal (Y, Cb/Cr signal)) on the RGB signal (image signal). Moreover, the image processing unit 111 performs YC processing such as color difference correction and noise reduction on the Y, Cb/Cr signal (image signal). The image processing unit 111 supplies the image signal obtained as a result of the image processing to the display control unit 103 and the control unit 104.

The detection processing unit 112 performs detection processing for controlling the camera head 14 (auto focus (AF) processing or the like) on the image signal (for example, Y, Cb/Cr signal) processed by the image processing unit 111. Note that the image signal is not limited to the Y, Cb/Cr signal, and may be any signal that can be subjected to the image processing, and may be a RAW signal in a case where no RAW processing is performed. Furthermore, in a case where the luminance signal (Y) is generated in the RAW processing, the image signal may be the luminance signal.

For example, the detection processing unit 112 detects, on the basis of pixel information (luminance signal (Y signal)) on each pixel of a designated area in the captured image of one frame captured by the imaging processing unit 54, a contrast or frequency component of an image in the designated area. Then, the detection processing unit 112 calculates a focus evaluation value for evaluating a focus state of the captured image (subject image in the captured image) on the basis of the contrast or frequency component thus detected. For example, the detection processing unit 112 calculates the contrast of the image in the designated area or the sum of high-frequency components of the image in the designated area as the focus evaluation value. Note that the larger the focus evaluation value, the sharper the focus. The detection processing unit 112 supplies detection information indicating the focus evaluation value thus calculated to the control unit 104.

The position estimation unit 113 performs processing of estimating the position of the camera head 14 on the basis of the image signal and the detection signal from the IMU 56. For example, the position estimation unit 113 creates, on the basis of the image signal, an environment map (three-dimensional coordinate map) and estimates the position of the camera head 14 on the environment map using visual-simultaneous localization and mapping (Visual-SLAM). Alternatively, for example, the position estimation unit 113 creates, on the basis of the image signal and the detection signal from the IMU 56, an environment map and estimates the position of the camera head 14 on the environment map using IMU-SLAM. The position estimation unit 113 supplies, to the control unit 104, position information indicating a result of the estimation of the position of the camera head 14.

Note that details of Visual-SLAM are described in, for example, "Andrew J. Davison, "Real-Time Simultaneous Localization and Mapping with a Single Camera", Proceedings of the 9th IEEE International Conference on Computer Vision Volume 2, 2003, pp. 1403-1410", Japanese Patent Application Laid-Open No. 2011-95797, or the like. Furthermore, details of IMU-SLAM are described in, for example, Japanese Patent Application Laid-Open No. 2017-185254.

The distance measurement unit 114 measures a distance to the subject of the camera head 14 and supplies distance information indicating a result of the measurement to the control unit 104. Note that the subject to be measured for the distance is, for example, an organ or a part of an organ in the living body.

Furthermore, any method may be used as a method for measuring the distance. For example, the imaging processing unit 54 is provided with an imaging element including a phase difference pixel or a time of flight (ToF) sensor, and the distance to the subject is measured using the imaging element or the ToF sensor.

The image recognition unit 115 performs processing of recognizing an object in the captured image based on the image signal. For example, the image recognition unit 115 performs processing of recognizing a predetermined object such as blood, a water droplet, or pollution in the captured image. Furthermore, for example, the image recognition unit 115 performs processing of recognizing a surgical scene in a surgical flow of a surgical procedure or the like on the basis of a result of the recognition of the object in the captured image. The image recognition unit 115 supplies, to the control unit 104, recognition information indicating the result of the recognition of the object or a result of the recognition of the surgical scene.

The display control unit 103 generates, on the basis of the image signal (Y, Cb/Cr Signal) processed by the image processing unit 111, a video signal for display by on-screen display (OSD) processing or the like under the control of the control unit 104. Then, the display control unit 103 outputs the video signal thus generated to the display device 16 (display unit 151) through the second transmission cable 17.

The control unit 104 includes, for example, a CPU and the like, and outputs a control signal through the first transmission cable 15, the second transmission cable 17, and the third transmission cable 19, so as to control the operations of the light source device 12, the camera head 14, and the display device 16 and control the overall operation of the imaging control device 18. The control unit 104 includes a focus control unit 122 and a zoom control unit 123.

The focus control unit 122 operates the lens drive unit 52 to adjust the focus of the lens unit 51 (to change the focus position). For example, the focus control unit 122 performs auto focus (AF) processing on the basis of the focus position detected by the lens position detection unit 53 and the detection information from the detection processing unit 112. Furthermore, the focus control unit 122 controls the AF operation on the basis of operation information from the input unit 57 or the input unit 105, the recognition information from the image recognition unit 115, or the like. For example, the focus control unit 122 changes a focus control condition to control a focus control operation.

Note that, as the AF function of the imaging system 1, for example, continuous AF and one-touch AF are implemented. The continuous AF is basically a function of continuously (uninterruptedly) performing AF. The continuous AF is switched on or off in accordance with operation of an operation unit (not illustrated) provided in the input unit 57 or the input unit 105, for example. The one-touch AF is, for example, a function of performing one-shot AF in accordance with operation of an operation unit (not illustrated) provided in the input unit 57 of the camera head 14.

The zoom control unit 123 operates the lens drive unit 52 to adjust the angle of view of the lens unit 51 (to change the zoom position).

The input unit 105 includes an operation device such as a button, a switch, a mouse, a keyboard, or a touchscreen, and receives a user's operation. The input unit 105 supplies an input signal input according to the user's operation to the control unit 104. The output unit 106 includes a speaker, a printer, or the like, and outputs various types of information. The storage unit 107 stores a program to be run by the control unit 104, information necessary for processing to be performed by the control unit 104, and the like.

The display device 16 includes the display unit 151. The display unit 151 includes a display using liquid crystal, organic electro luminescence (EL), or the like, and displays the display image based on the video signal from the imaging control device 18.

<Configuration Including Sensor Involved in AF Processing>

A configuration example including a sensor involved in the AF processing will be described with reference to FIG. 3.

A reset sensor 201 used to set an initial position of the focus lens 61 is provided in the camera head 14. In the example illustrated in FIG. 3, the reset sensor 201 is installed at a position P0 between a Far mechanical end (mechanical end) and a Far optical end (optical end).

The reset sensor 201 may be provided at a position other than the position P0. For example, the reset sensor 201 may be provided at a predetermined position between the Far optical end and a Near optical end. When the focus lens 61 passes in front of the reset sensor 201, the reset sensor 201 detects the passage of the focus lens 61. The reset sensor 201 functions as a measurement unit that measures the position of the focus lens 61.

The focus lens 61 is operable between the Far mechanical end and a Near mechanical end. The initial position of the focus lens 61 is defined as a position P1. For example, the position P1 is set at a predetermined position between the Far optical end and the Near optical end. The initial position is set as a position where the focus lens 61 is positioned, for example, upon start of power supply to the camera head 14 (upon the power being turned on, upon energization, or the like).

Figure 3:
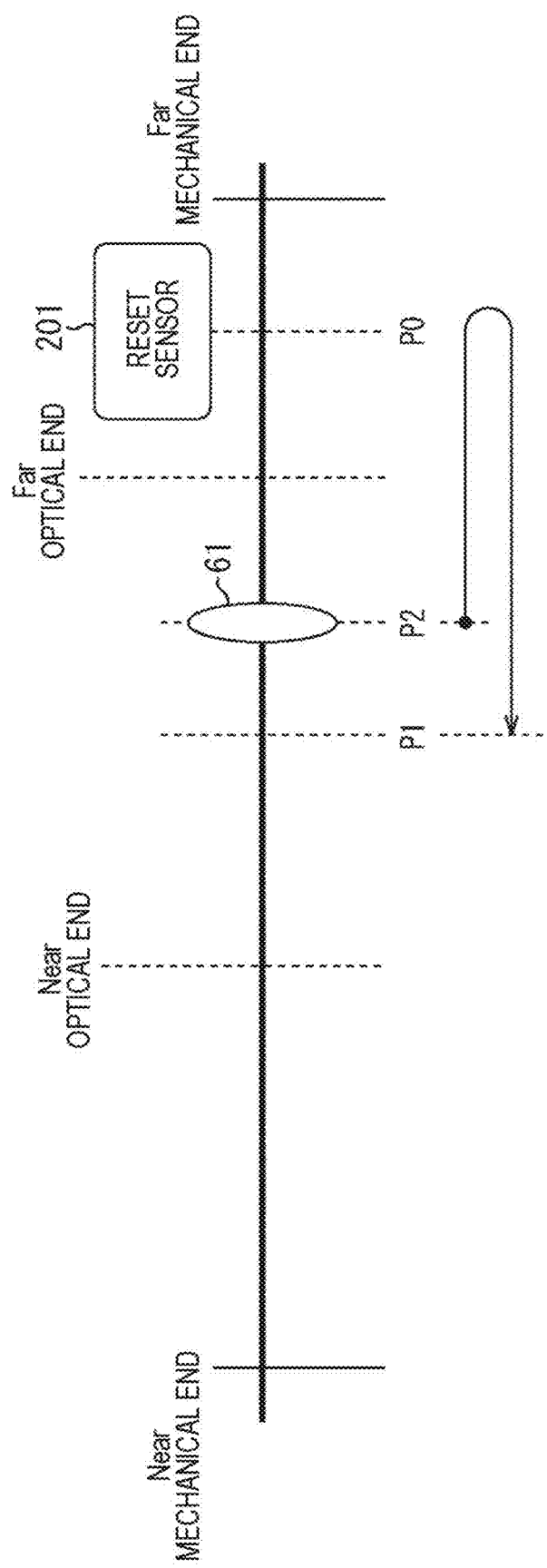
FIG. 3 is a diagram for describing a reset sensor.

For example, movement of the focus lens 61 when the position of the focus lens 61 is initialized is indicated by an arrow in FIG. 3. For example, a position where focus lens 61 is positioned when the power is turned off is defined as a position P2. When the power is turned on, the focus lens 61 is moved toward the reset sensor 201, that is, the Far mechanical end in the example illustrated in FIG. 3. When the focus lens 61 moves from the position P2 toward the Far mechanical end, the focus lens 61 passes in front of the reset sensor 201.

The reset sensor 201 detects that the focus lens 61 has passed in front of the reset sensor 201. The detection of the focus lens 61 by the reset sensor 201 shows that the focus lens 61 is positioned at the position P0 of the reset sensor 201. A distance to the initial position P1 of the focus lens 61 is preset on the basis of the position P0 of the reset sensor 201. The focus lens 61 is moved from the position P0 of the reset sensor 201 to the initial position P1 on the basis of a movement amount (drive voltage) for moving the focus lens 61. As described above, the focus lens 61 is set at the initial position P1.

In the present embodiment, the reset sensor 201 is used not only when the focus lens 61 is moved to the initial position but also when the movement amount of the focus lens 61 applied to the AF processing is set.

During the AF processing, an operation in which the focus lens 61 is moved back and forth near a focal position, called wobbling, is performed. There has been a possibility that a change in characteristics of the camera head 14 prevents the wobbling from remaining constant.

The camera head 14 is sterilized under an environment such as high temperature and high pressure called an autoclave. The high temperature, the high pressure, or the like may change characteristics of grease of the actuator 71 that drives the focus lens 61. The change in characteristics of the grease is caused by, for example, moisture evaporation from or elution of the grease.

Furthermore, there is a possibility that a change in characteristics of the actuator 71 that drives the focus lens 61, mechanical looseness, or the like occurs due to aging. Such factors may change hysteresis at the time of wobbling of the focus lens 61 and prevents wobbling equivalent to wobbling at the beginning of use of the camera head 14 from being performed. For example, in a case where an oscillation width A is designated as a wobbling oscillation width at the beginning of use, wobbling is performed with the oscillation width A, but a change in hysteresis may make, even when the oscillation width A is designated as an oscillation width, the oscillation width greater or less than the oscillation width A.

In a case where the wobbling oscillation width is different from the designated wobbling oscillation width, there has been a possibility that accuracy of the AF processing is less than accuracy at the beginning of use. In the embodiment to which the present technology described below is applied, the AF processing is performed with a change in hysteresis taken into account, so that it is possible to prevent the accuracy of the AF processing from deteriorating.

<Processing at the Beginning of Use>

In order to perform the AF processing with a change in hysteresis taken into account, hysteresis at the beginning of use is measured and held. Processing of measuring and holding hysteresis at the beginning of use will be described with reference to a flowchart of FIG. 4.

Figure 4:
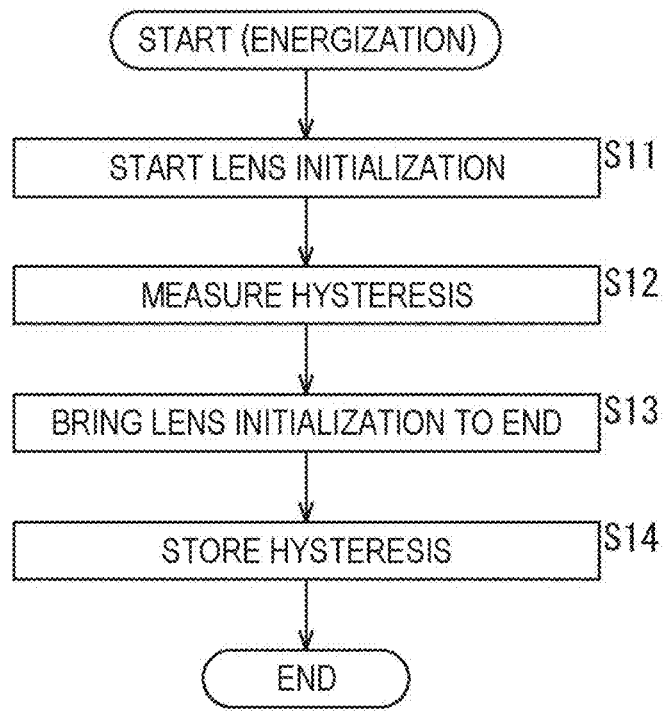
FIG. 4 is a diagram for describing measurement of hysteresis at the beginning of use.

The processing of the flowchart of FIG. 4 is performed at the beginning of use of the camera head 14. "Performed at the beginning of use" may correspond to "performed as one process at the time of manufacture of the camera head 14", or may correspond to "performed when the camera head 14 is energized for the first time after being installed at an installation place".

In step S11, lens initialization is started. Here, the lens initialization is a process of measuring hysteresis at the beginning of use of the camera head 14. In step S12, hysteresis is measured. The hysteresis measured in step S12, hereinafter referred to as initial hysteresis as needed, is hysteresis including lens hysteresis regarding the focus lens 61 and reset sensor hysteresis regarding the reset sensor.

Lens hysteresis HL will be described with reference to FIG. 5. The lens hysteresis HL can be measured when a flange back (FB) distance is adjusted. The flange back distance is a distance from a mount surface of a lens (focus lens 61 in this case) to an image sensor in a camera. There is a possibility that a value of the flange back distance varies in a manner that depends on an error in attachment of the lens or an error in attachment of the image sensor (varies in a manner that depends on an individual).

The flange back distance is adjusted by assuming a subject placed at a predetermined distance and bringing the subject into focus, for example. When there is no error, placing the focus lens 61 at the position assumed by the camera (in this case, the camera head 14) brings the subject into focus. When there is an error, however, a position that differs from the position assumed by the camera comes into focus. Note that the lens hysteresis HL may be measured at any timing or by any method during manufacture calibration, and for example, the lens hysteresis may be measured by an external position sensor.

Such a difference is measured before shipment, for example, and the AF processing is performed with the measured error taken into account.

In order to measure the lens hysteresis HL, the focus lens 61 is moved from the Near side to the Far side, and a position that comes into focus is measured. In FIG. 5, the position that comes into focus when the focus lens 61 is moved from the Near side to the Far side is defined as a subject position NF. Next, the focus lens 61 is moved from the Far side to the Near side, and a position that comes into focus is measured. In FIG. 5, the position that comes into focus when the focus lens 61 is moved from the Far side to the Near side is defined as a subject position FN.

Figure 5:
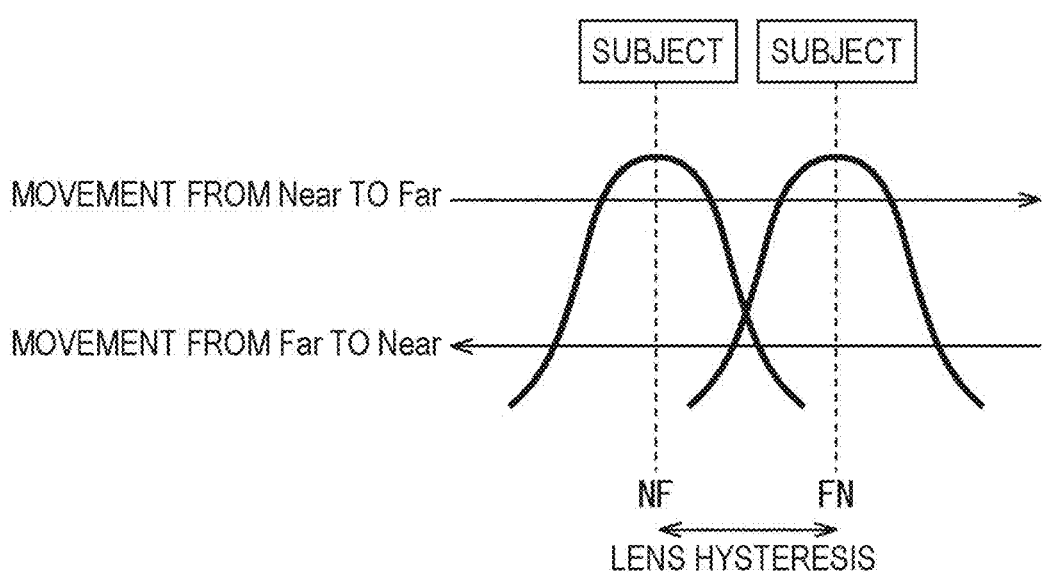
FIG. 5 is a diagram for describing lens hysteresis.

As illustrated in FIG. 5, there is a possibility that the subject position NF and the subject position FN are different from each other. This difference in position is measured as an adjustment to the flange back distance. Furthermore, as hysteresis, the difference between the subject position NF and the subject position FN is measured. That is, the lens hysteresis HL=(the subject position NF−the subject position FN) is measured.

The lens hysteresis HL is a difference between a focus position when the focus lens 61 moves from the Near side to the Far side and a focus position when the focus lens 61 moves from the Far side to the Near side. As described above, a difference between a result obtained when the focus lens 61 moves in a predetermined direction and a result obtained when the focus lens 61 moves in a direction opposite to the predetermined direction is referred to as hysteresis.

The lens hysteresis HL is hysteresis regarding the focus lens 61 and is mechanical hysteresis. There is a possibility that characteristics of the grease or mechanical structure of the actuator 71 that drives the focus lens 61 change from characteristics at the time of shipment due to friction, heat, or the like.

Accordingly, there is a possibility that the value of the lens hysteresis HL changes. In the present embodiment, as will be described later, the AF processing is performed with a change in the lens hysteresis HL taken into account.

In step S12 (FIG. 4), initial hysteresis H0 including the lens hysteresis HL and reset sensor hysteresis HR is measured. How to measure the reset sensor hysteresis HR will be described with reference to FIG. 6.

In order to measure the reset sensor hysteresis HR, the focus lens 61 is moved from the Near side to the Far side, and a position when the focus lens 61 passes in front of the reset sensor 201 is measured. When the focus lens 61 is moved from the Near side to the Far side, and a voltage sufficiently decreases from Hi to Low, it is determined that the focus lens 61 has passed in front of the reset sensor 201. The position at this time is set as a determination position NF.

Next, the focus lens 61 is moved from the Far side to the Near side, and a position when the focus lens 61 passes in front of the reset sensor 201 is measured. When the focus lens 61 is moved from the Far side to the Near side, and the voltage sufficiently increases from Low to Hi, it is determined that the focus lens 61 has passed in front of the reset sensor 201. The position at this time is referred to as a determination position FN.

Figure 6:
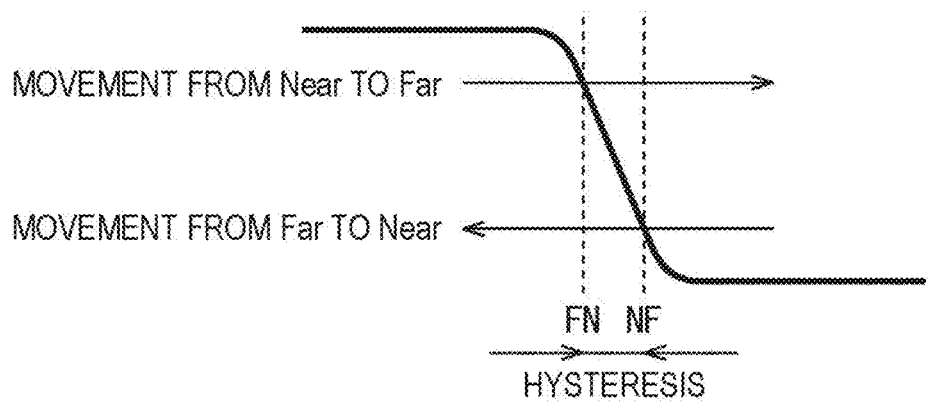
FIG. 6 is a diagram for describing how to measure hysteresis.

As illustrated in FIG. 6, there is a possibility that the determination position NF and the determination position FN are different from each other. This difference in position is measured as the reset sensor hysteresis HR. As the reset sensor hysteresis HR, the difference between the determination position NF and the determination position FN is measured. That is, the reset sensor hysteresis HR=(the determination position NF−the determination position FN) is measured.

The initial hysteresis measured in step S12 is measured by a process similar to the measurement of the reset sensor hysteresis HR described with reference to FIG. 6. That is, the reset sensor hysteresis HR measured as hysteresis at the time of manufacture or shipment can be used as the initial hysteresis. Note that hysteresis at the time of the first use by the user after shipment may be used as the initial hysteresis.

As will be described later, hysteresis (hereinafter, referred to as energization hysteresis) is also measured when the camera head 14 is energized. The energization hysteresis is also measured as described with reference to FIG. 6.

The operation performed in order to measure the initial hysteresis, in other words, the operation performed in order to measure the energization hysteresis, is an operation in which the focus lens 61 moves back and forth in front of the reset sensor 201. The above-described operation performed in order to reset the focus lens 61 to the initial position is also the operation in which the focus lens 61 moves back and forth in front of the reset sensor 201.

This allows the energization hysteresis to be measured during the operation in which the focus lens 61 is reset to the initial position. That is, the operation in which the focus lens 61 is reset to the initial position can include the measurement of the energization hysteresis.

The initial hysteresis (energization hysteresis) is a value including the lens hysteresis HL and the reset sensor hysteresis HR. That is, the initial hysteresis (energization hysteresis) can be expressed as the initial hysteresis(energization hysteresis)==the lens hysteresis HL+the reset sensor hysteresis HR.

Note that, under an ideal environment, it is required that the reset sensor hysteresis HR and the lens hysteresis HL be separately measured. Under a real environment, however, the reset sensor hysteresis HR and the initial hysteresis (energization hysteresis) HO including a component of the lens hysteresis HL of the lens are measured. Note that the reset sensor hysteresis HR and the lens hysteresis HL may be separately measured.

The reset sensor hysteresis HR is hysteresis regarding the reset sensor 201, and is a difference between a position at which the focus lens 61 passes in front of the reset sensor 201 when moving from the Near side to the Far side and a position at which the focus lens 61 passes in front of the reset sensor 201 when moving from the Far side to the Near side. As described above, a difference between a result obtained when the focus lens 61 moves in a predetermined direction and a result obtained when the focus lens 61 moves in a direction opposite to the predetermined direction is referred to as hysteresis.

Return to the description with reference to the flowchart of FIG. 4. In step S12, when hysteresis, in this case, the initial hysteresis, is measured, the processing proceeds to step S13. In step S13, the process of initializing the lens is brought to an end, and the processing proceeds to step S14.

In step S14, the measured initial hysteresis is stored. The initial hysteresis thus stored is used as a reference value for processing to be described later. The initial hysteresis may be stored in the lens position detection unit 53 of the camera head 14, may be stored in the lens drive unit 52, or may be stored in the imaging control device 18 (for example, the storage unit 107). Furthermore, the initial hysteresis may be stored in the communication unit 55 of the camera head, the connector 21, or the connector 22.

<Processing Upon Energization>

Figure 7:
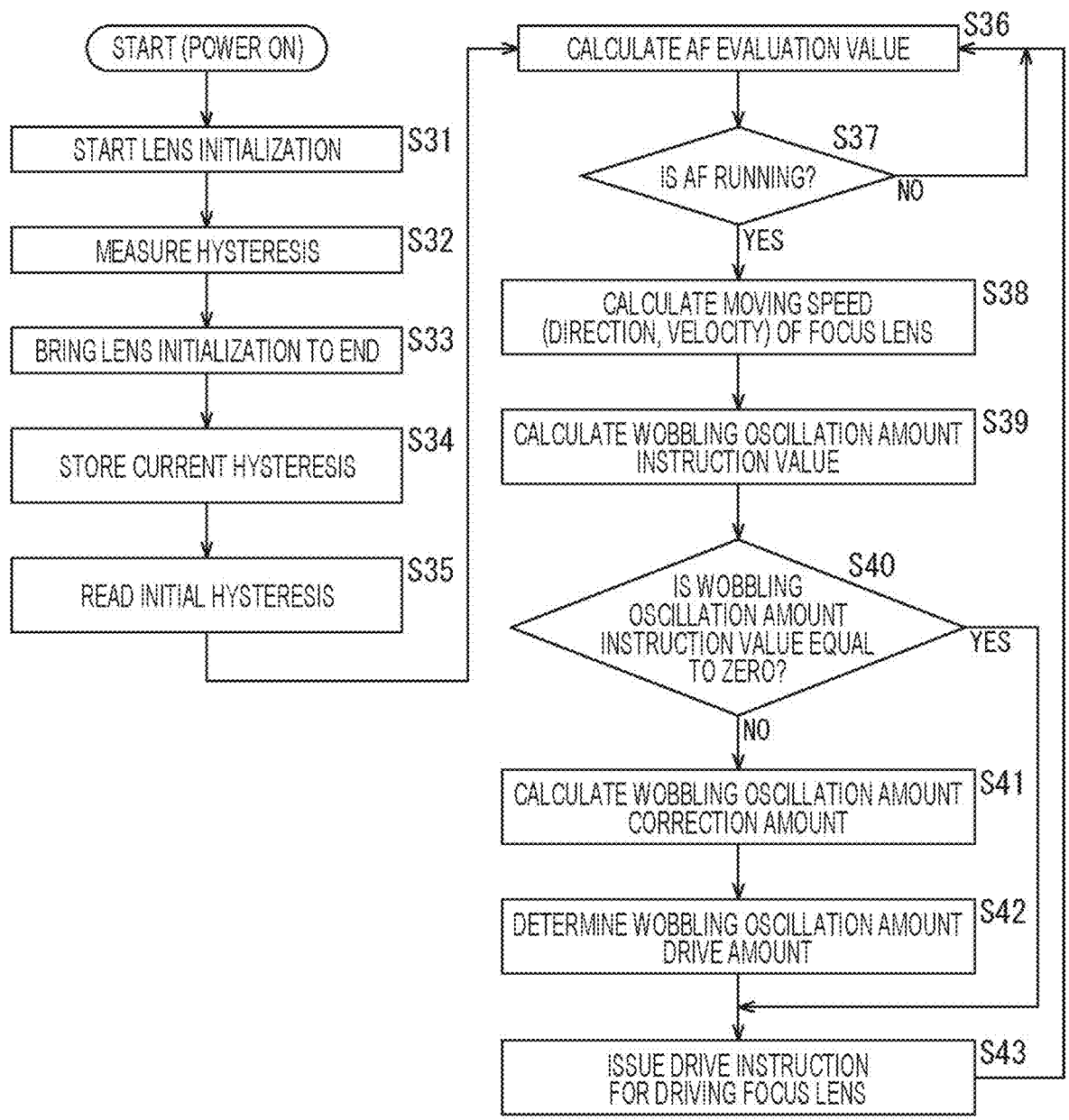
FIG. 7 is a diagram for describing processing upon energization.

Processing upon energization will be described with reference to the flowchart of FIG. 7. "Upon energization" is, for example, a time when the power of the camera head 14 is turned on (at the time of an initial operation immediately after energization), a time when the camera head 14 is connected to the imaging control device 18, or the like.

Processes in steps S31 to S33 are similar to the processes in S11 to S13 of the flowchart illustrated in FIG. 4, so that no description will be given below of the processes to avoid redundancy.

The energization hysteresis is acquired by performing the processes in steps S31 to S33. In step S34, the current hysteresis (energization hysteresis) is held.

The processes in steps S31 to S33 are performed when the camera head 14 is energized, but when the processes are performed when the camera head 14 is not stationary, there is a possibility that hysteresis is measured inaccurately. The camera head 14 is held by an operator or a scopist, but in such a case, when hysteresis is measured, there is a possibility that a hysteresis value fluctuates.

The processes in steps S31 to S33 may be performed when the camera head 14 is energized and when the camera head 14 is stationary (the captured image is static). Furthermore, with an acceleration sensor (IMU 56 in FIG. 2) provided in a part of the camera head 14, hysteresis may be measured when a signal obtained from the acceleration sensor is analyzed and determined to show that the camera head 14 is stationary.

Furthermore, when the camera head 14 is determined not to be stationary at the time of the measurement of hysteresis, a message prompting the operator or the scopist not to move the camera head 14 may be displayed or read out, or a warning sound may be emitted.

Furthermore, there is a possibility that the camera head 14 is replaced, or erroneously detached and reattached. Since the processes in steps S31 to S33 are performed when the camera head 14 is energized, the processes are performed each time the camera head is erroneously detached and reattached. At this time, hysteresis may be remeasured, but it is supposed that there is no change in hysteresis, so that control may be performed so as to prevent the processing of measuring hysteresis, that is, the processes in steps S31 to S33, from being performed.

That is, a replacement timing of the camera head 14 is measured, and in a case where the camera head 14 is replaced with a same camera head, and a replacement timing interval is short, the processing of measuring hysteresis may be omitted, and the held hysteresis value may be used. As described above, it is possible to eliminate a time required for the measurement of hysteresis and to restart surgery earlier.

In a case where the hysteresis (energization hysteresis) value measured in step S32 is largely different from a value measured last time, an instruction for remeasurement may be issued to the user or the control unit. In this case, the energization hysteresis measured last time is stored with the energization hysteresis associated with identification information on the camera head 14.

Furthermore, in a case where the instruction for remeasurement is issued to the user, a message prompting the user to perform measurement may be displayed or read out. Alternatively, the instruction for remeasurement may be issued to the control unit to cause the control unit to perform remeasurement (perform remeasurement without seeking permission from the user).

Furthermore, rather than performing remeasurement, the energization hysteresis measured last time may be used. Alternatively, a predetermined value, for example, a preset value (initial set value) may be used.

The control unit that controls measurement of hysteresis can be the lens position detection unit 53, the lens drive unit 52, or the like in the camera head 14. Alternatively, the control unit can be provided in the imaging control device 18. Alternatively, a dedicated control unit responsible for controlling and holding hysteresis may be provided in the camera head 14 or the imaging control device 18. Alternatively, the AF processing, for example, processing of calculating an AF evaluation value to be described later, is performed by the detection processing unit 112 of the imaging control device 18, so that hysteresis may also be measured by the detection processing unit 112.

Return to the description with reference to the flowchart of FIG. 6. In step S35, the stored initial hysteresis is read.

In step S36, the AF evaluation value is calculated. In a case of a contrast AF method, for the AF evaluation value, an amount of frequency components contained in luminance data of a specific area of the captured image is used as an evaluation value for evaluating a focus state of the image of the subject in the specific area. That is, the amount of frequency components contained in luminance data of each pixel in the specific area in data of the captured image is integrated, and the integrated value is calculated as the AF evaluation value. The higher the AF evaluation value calculated as described above, the higher the contrast of the specific area, so that it is possible to evaluate that the image of the subject in the specific area is in focus.

Under the contrast AF method, the AF function is performed by moving the focus lens on the basis of the focus state of the image of the subject evaluated on the basis of such an AF evaluation value and stopping the focus lens at the position where the AF evaluation value is the highest. In other words, when the AF function is performed, the focus lens is moved to a plurality of positions, and the AF evaluation value is calculated at each position.

Note that the method for calculating the AF evaluation value and the contrast AF method are merely examples, and other calculation methods and other AF methods are also applicable to the present technology.

In step S37, it is determined whether or not the AF processing is running. In a case where it is determined in step S37 that the AF processing is not running, the processing returns to step S36, and the subsequent processes are repeated.

On the other hand, in a case where it is determined in step S37 that the AF processing is running, the processing proceeds to step S38. In step S38, a moving speed (direction, velocity) of the focus lens 61 is calculated. Furthermore, in step S39, a wobbling oscillation amount instruction value is calculated.

The wobbling oscillation amount instruction value is a value obtained by calculating, using the moving direction and velocity of the focus lens 61 calculated in step S38, an oscillation width applied to a wobbling operation in which the focus lens 61 is moved back and forth is performed during the AF processing.

Note that the wobbling oscillation amount instruction value can be calculated by a predetermined algorithm. In a case where the predetermined algorithm is an algorithm created on the assumption that a lens makes ideal movement, in other words, an algorithm that can be used in a general-purpose manner, it is conceivable that the predetermined algorithm is an algorithm created without individual differences such as play in the actuator that drives the lens taken into account. Therefore, the wobbling oscillation amount instruction value may be calculated with individual differences such as the play in the actuator that drives the lens taken into account.

For example, a value measured as the play in the actuator may be added to a value calculated by the predetermined algorithm, and a value obtained as a result of the addition may be used as the wobbling oscillation amount instruction value. Furthermore, the value measured as the play in the actuator can be measured and stored, for example, when the flange back distance described above is adjusted.

When the wobbling oscillation amount instruction value is calculated in step S39, the processing proceeds to step S40. In step S40, it is determined whether or not the wobbling oscillation amount instruction value is 0. In a case where it is determined in step S40 that the wobbling oscillation amount instruction value is not 0, the processing proceeds to step S41.

In step S41, a wobbling oscillation amount correction amount is calculated. The wobbling oscillation amount correction amount is calculated by the following equation:

$$\text{Wobbling oscillation amount correction amount} = (\text{energization hysteresis} - \text{initial hysteresis}) * \alpha$$

The wobbling oscillation amount correction amount is a value obtained by multiplying, by a coefficient $\alpha$, a value obtained by calculating a difference between the energization hysteresis measured upon energization and the initial hysteresis (reference hysteresis) measured at the time of manufacture.

The wobbling oscillation amount correction amount is a correction amount that becomes 0 in a case where there has been no change in the hysteresis obtained at the time of manufacture, or a correction amount corresponding to, in a case where there has been a change in the hysteresis obtained at the time of manufacture, the change amount.

The coefficient $\alpha$ may be a fixed value set in advance, or may be a variable value that varies in a manner that depends on any condition. Furthermore, the coefficient $\alpha$ may be set at a value reflecting an individual difference of the camera head 14.

Furthermore, the wobbling oscillation amount correction amount may be calculated without multiplication by the coefficient $\alpha$, in other words, only the difference may be used as the wobbling oscillation amount correction amount.

Furthermore, the coefficient $\alpha$ may differ between a case where the value of (energization hysteresis − initial hysteresis) is negative and a case where the value is positive. For example, the coefficient $\alpha$ may be set at 0 when the value of (energization hysteresis − initial hysteresis) is negative, and the coefficient $\alpha$ may be set at 1 when the value is positive.

Furthermore, as will be described later, when the wobbling oscillation amount correction amount is calculated, the processing proceeds to step S42, but in a case where the value (absolute value) of (energization hysteresis − initial hysteresis) becomes greater than a predetermined threshold, the proceeding need not proceed to the next process, processes subsequent to the next process may be performed.

For example, in a case where the value (absolute value) of (energization hysteresis − initial hysteresis) becomes greater than the predetermined threshold, it is determined that an error has occurred, and a message for notifying the user of the occurrence of the error is displayed on the display unit

Figure 2:
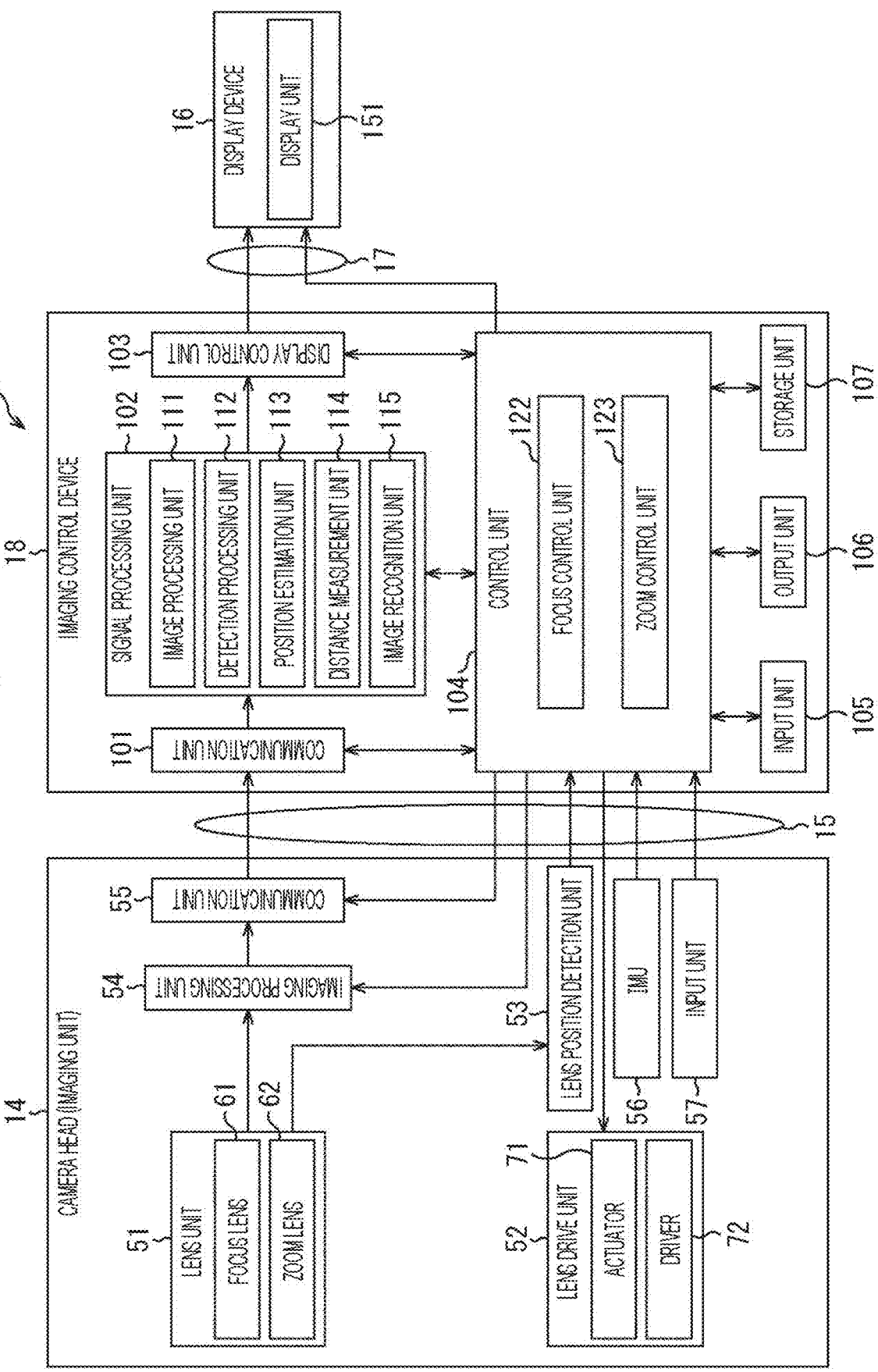
FIG. 2 is a block diagram illustrating configuration examples of a camera head, a display device, and an imaging control device.

151 (FIG. 2). Examples of the message include a message for prompting a repair request, and a contact address (telephone number, mail address, address of website of contact address, or the like) at the time of issuing the repair request.

Furthermore, in a case where (an absolute value of) a difference between energization hysteresis measured this time and energization hysteresis measured last time becomes greater than the predetermined threshold as in a case where the value (absolute value) of (energization hysteresis−initial hysteresis) becomes greater than the predetermined threshold, it is determined that an error has occurred, and a message for notifying the user of the occurrence of the error may be displayed on the display unit 151 (FIG. 2).

When the wobbling oscillation amount correction amount is calculated on the basis of the above-described operation expression in step S41, the processing proceeds to step S42. In step S42, a wobbling oscillation amount drive amount is determined. The wobbling oscillation amount drive amount is calculated by the following equation.

> Wobbling oscillation amount drive amount=wobbling oscillation amount instruction value+wobbling oscillation amount correction amount The wobbling oscillation amount drive amount is calculated by adding the wobbling oscillation amount instruction value calculated in step S39 and the wobbling oscillation amount correction amount calculated in step S41. Note that the wobbling oscillation amount drive amount can be a control amount required for controlling the actuator 71 (FIG. 2) in accordance with the movement amount for moving the focus lens 61 with the oscillation width set for wobbling, specifically, a voltage value applied to the actuator 71.

When the wobbling oscillation amount drive amount is determined in step S42, a drive instruction for driving the focus lens 61 is issued in step S43 on the basis of the wobbling oscillation amount drive amount thus determined. When the drive instruction is issued, the processing returns to step S36, and the subsequent processes are repeated.

On the other hand, in a case where it is determined in step S40 that the wobbling oscillation amount instruction value is 0, the processing proceeds to step S43, and the drive instruction is issued. In this case, the drive instruction based on an instruction value, that is, the wobbling oscillation amount instruction value=0, is issued.

As described above, during the AF processing, the wobbling oscillation amount (the instruction value such as the voltage value for realizing the oscillation amount) is corrected in accordance with the difference between the hysteresis at the beginning of use and the hysteresis at the time of use, so that, even when the characteristics of the actuator 71 that drives the focus lens 61 change, the oscillation amount that has reflected the change can be set. It is therefore possible to prevent the accuracy of the AF processing from deteriorating.

For example, in a case of AF processing to which the present technology is not applied, when there is a change in the characteristics of the actuator, there is a possibility that the focus lens fails to move by a desired movement amount.

In a case where the wobbling oscillation width applied to the AF processing is increased, an image becomes blurred, and particularly in a case of a moving image, the user visually recognizes the blurring of the image during the wobbling, so that it is preferable that the possibility of the provision of such a blurred image be eliminated as much as possible.

Therefore, a decrease in the wobbling oscillation width applied to the AF processing allows a decrease in possibility of the provision of a blurred image.

However, there is a possibility that the characteristics of the actuator that drives the focus lens, the characteristics being affected by grease, mechanical play, and the like of the actuator, change due to aging, and there is a possibility that resistance at the time of movement of the focus lens increases or decreases due to a change in the characteristics of the actuator.

In a case where the resistance at the time of movement of the focus lens increases, there is a possibility that the focus lens does not move, or the movement amount decreases with the wobbling oscillation amount instruction value applied to the AF processing before the increase in resistance, and the focus lens fails to move by the expected movement amount accordingly. Furthermore, in a case where the resistance at the time of movement of the focus lens decreases, there is a possibility that the focus lens moves too much and more than the expected movement amount with the wobbling oscillation amount instruction value applied to the AF processing before the decrease in resistance.

According to the present technology, even in a case where the resistance at the time of movement of the focus lens increases or decreases, the movement amount (instruction value for movement by a predetermined movement amount) can be set with the increase or decrease taken into account, so that the focus lens 61 can be moved by a desired movement amount.

OTHER EMBODIMENTS

In the above-described embodiment, the case where the camera head 14 includes the reset sensor 201, and hysteresis is obtained using the reset sensor 201 has been described as an example. In other words, in the above-described embodiment, the case where the position of the focus lens 61 is measured using the reset sensor 201 has been described as an example.

The position of the focus lens 61 may be measured using a sensor other than the reset sensor 201, and hysteresis may be measured using the sensor. For example, a position sensor that measures the position of the focus lens 61 may be used.

Furthermore, in the above-described embodiment, the case where hysteresis is measured using the reset sensor 201, the position sensor, or the like has been described as an example, but hysteresis may be measured without using such sensors.

For example, hysteresis can be measured using a change in angle of view of an image captured when the focus lens 61 is moved back and forth. For example, the focus lens 61 is moved by the predetermined oscillation width A (an oscillation width greater than an oscillation width applied to wobbling), and a difference between the angle of view of the image captured when the focus lens 61 is moved to the Far side and the angle of view of the image captured when the focus lens 61 is moved to the Near side is measured.

The predetermined oscillation width A (an instruction value for movement by the oscillation width A) of focus lens 61 applied to the measurement of hysteresis is set constant, and a difference between the angle of view on the Far side and the angle of view on the Near side is measured. Even in a case where an instruction for movement by the predetermined oscillation width A is issued, there is a possibility that the focus lens 61 moves by an oscillation width less or greater than the predetermined oscillation width A in a case where the characteristics of the actuator 71 that drives the focus lens 61 changes. When the movement amount by which focus lens 61 moves is different, the difference between the angle of view on the Far side and the angle of view on the Near side also changes.

The AF processing may be performed as in the above-described embodiment using, as hysteresis, the difference between the angle of view on the Far side and the angle of view on the Near side obtained when the focus lens 61 is moved by such a predetermined oscillation width A. Note that the present embodiment further includes a case where hysteresis is measured using a change amount other than the difference in angle of view, such as a value obtained by adding the angle of view or a value obtained by multiplying the angle of view by a coefficient.

In the above-described embodiment, for example, as described with reference to FIG. 7, the mode where hysteresis is measured upon energization such as when the power is turned on has been described as an example, but hysteresis may be measured at a time other than energization.

For example, hysteresis may be monitored during energization. Hysteresis may be monitored during energization, and the wobbling oscillation amount may be controlled using the hysteresis thus monitored.

<Recording Medium>

The above-described series of processes may be performed by hardware or software. In a case where the series of processes is performed by software, a program constituting the software is installed from a program recording medium onto a computer incorporated into dedicated hardware, a general-purpose personal computer, or the like.

Figure 8:
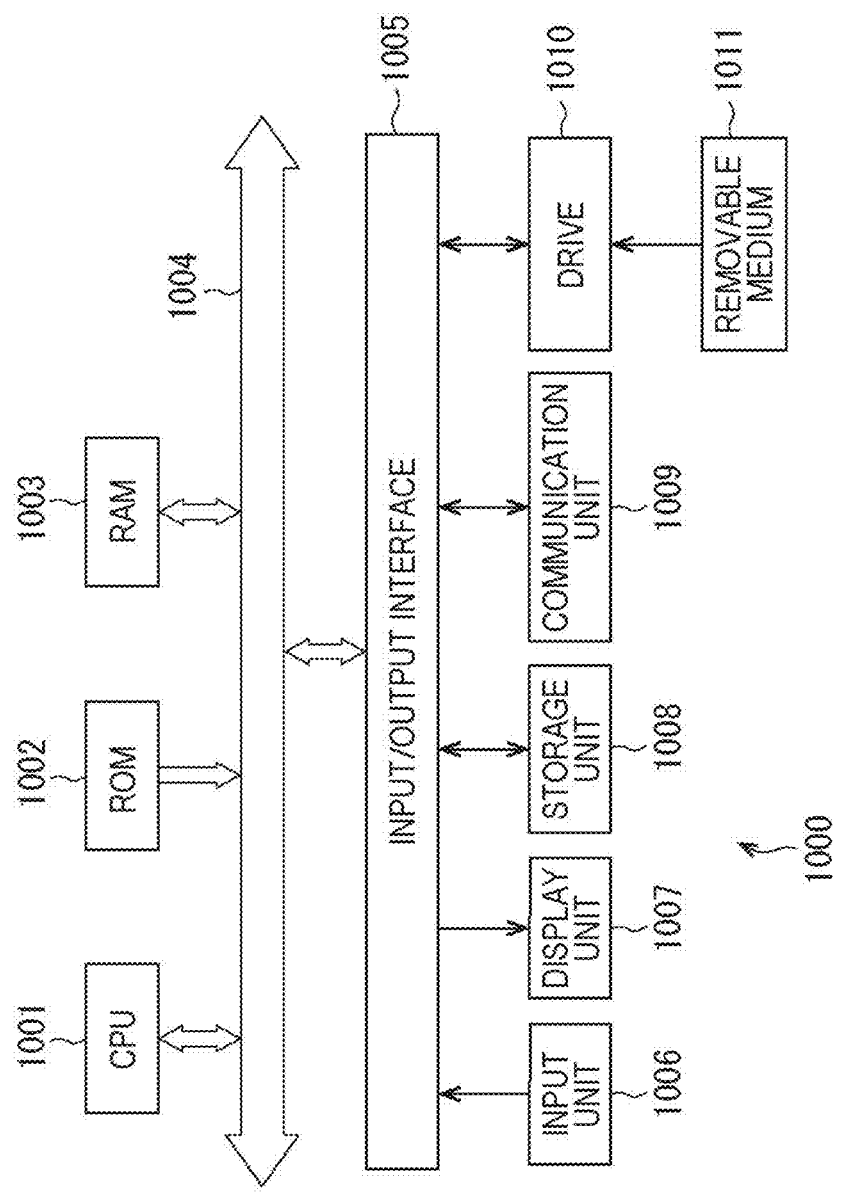
FIG. 8 is a diagram for describing a recording medium.

FIG. 8 is a block diagram illustrating a configuration example of hardware of the computer that performs the above-described series of processes in accordance with the program.

A central processing unit (CPU) 1001, a read only memory (ROM) 1002, and a random access memory (RAM) 1003 are mutually connected over a bus 1004.

An input/output interface 1005 is further connected to the bus 1004. An input unit 1006 including a keyboard, a mouse, and the like, and an output unit 1007 including a display, a speaker, and the like are connected to the input/output interface 1005.

Furthermore, a storage unit 1008 including a hard disk, a non-volatile memory, or the like, a communication unit 1009 including a network interface or the like, and a drive 1010 that drives a removable medium 1011 are connected to the input/output interface 1005.

In the computer configured as described above, for example, the CPU 1001 performs the above-described series of processes by loading a program stored in the storage unit 1008 onto the RAM 1003 via the input/output interface 1005 and the bus 1004 and running the program.

The program to be run by the CPU 1001 is provided, for example, using the removable medium 1011 having the program recorded thereon or via a wired or wireless transmission medium such as a local area network, the Internet, or digital broadcasting, and is installed into the storage unit 1008.

Note that the program to be run by the computer may be a program in which the processes are performed in time-series order described herein, or may be a program in which the processes are performed in parallel or at a required timing such as when a corresponding process is called.

Note that, herein, a system means a set of a plurality of components (devices, modules (parts), etc.), regardless of whether or not all the components are in the same housing. Therefore, a plurality of devices housed in separate housings and connected over a network, and one device in which a plurality of modules is housed in one housing are both systems.

Note that the effects described herein are merely examples and are not limited, and other effects may be provided.

The embodiments of the present technology are not limited to the above-described embodiments, and various modifications may be made without departing from the gist of the present technology.

For example, the present technology may have a configuration of cloud computing shared and processed in cooperation among a plurality of devices over a network.

Furthermore, each step described in the above-described flowcharts may be performed by one device or may be shared and performed by a plurality of devices.

Moreover, in a case where a plurality of processes is included in one step, the plurality of processes included in the one step may be performed by one device or may be shared and performed by a plurality of devices.

Note that the present technology can also have the following configurations.

(1)

An endoscope system including:

a drive unit that drives a lens;

a measurement unit that measures a position of the lens; and a control unit that controls focusing, in which the control of the focusing includes setting a control amount of wobbling at the time of the focusing on the basis of first hysteresis that is held and second hysteresis that is measured upon energization.

(2)

The endoscope system according to claim 1, in which the measurement unit includes a sensor that measures the position of the lens by detecting passage of the lens.

(3)

The endoscope system according to claim 1 or 2, in which the first hysteresis is a value measured at the time of manufacture.

(4)

The endoscope system according to any one of claims 1 to 3, in which the second hysteresis is measured when the lens is moved to an initial position.

(5)

The endoscope system according to any one of claims 1 to 4, in which the second hysteresis is measured during an initial operation immediately after energization.

(6)

The endoscope system according to any one of claims 1 to 5, in which the second hysteresis is measured by monitoring hysteresis applied to movement of the lens upon energization.

(7)

The endoscope system according to any one of claims 1 to 6, in which the first hysteresis and the second hysteresis are differences between a result obtained when the lens is moved to one side and a result obtained when the lens is moved to another side.

(8)

The endoscope system according to any one of claims 1 to 7, in which the control amount is a value obtained by correcting a wobbling oscillation width calculated by a predetermined algorithm using a difference between the first hysteresis and the second hysteresis as a correction amount.

(9)

The endoscope system according to claim 8, in which the correction amount is a value obtained by multiplying the difference between the first hysteresis and the second hysteresis by a coefficient.

(10)

The endoscope system according to any one of claims 1 to 9, in which the second hysteresis is measured when a captured image is determined to be static.

(11)

The endoscope system according to any one of claims 1 to 10, in which the second hysteresis is measured when a captured image is determined to be static on the basis of a signal from an acceleration sensor.

(12)

The endoscope system according to any one of claims 1 to 11, in which in a case where a replacement timing at which a camera head including the lens is replaced is measured, the camera head is replaced with a same camera head, and the replacement timing is less than or equal to a predetermined interval, the second hysteresis is not measured.

(13)

The endoscope system according to any one of claims 1 to 12, in which in a case where the second hysteresis is largely different from the second hysteresis measured last time, the second hysteresis is remeasured.

(14)

The endoscope system according to any one of claims 1 to 12, in which in a case where the second hysteresis is largely different from the second hysteresis measured last time, the second hysteresis measured last time is used.

(15)

The endoscope system according to any one of claims 1 to 14, in which the first hysteresis and the second hysteresis are calculated from an angle of view of an image captured at one end and an angle of view of an image captured at another end when the lens is moved by a predetermined width.

(16)

An endoscope control method of an endoscope system, the endoscope system including
 a drive unit that drives a lens,
 a measurement unit that measures a position of the lens, and
 a control unit that controls focusing,
the endoscope control method including:
 setting, by the control unit, a control amount of wobbling at the time of the focusing on the basis of first hysteresis that is held and second hysteresis that is measured upon energization; and
 controlling, by the control unit, the focusing on the basis of the control amount.

(17)

A program for causing a computer to perform a process, the computer being configured to control an endoscope system, the endoscope system including
 a drive unit that drives a lens,
 a measurement unit that measures a position of the lens, and
 a control unit that controls focusing,
the process including:
 setting a control amount of wobbling at the time of the focusing on the basis of first hysteresis that is held and second hysteresis that is measured upon energization; and
 controlling the focusing on the basis of the control amount.

REFERENCE SIGNS LIST

1 Imaging system
11 Insertion unit
12 Light source device
13 Light guide
14 Camera head
15 First transmission cable
16 Display device
17 Second transmission cable
18 Imaging control device
19 Third transmission cable
20, 21 Connector
51 Lens unit
52 Lens drive unit
53 Lens position detection unit
54 Imaging processing unit
55 Communication unit
57 Input unit
61 Focus lens
62 Zoom lens
71 Actuator
72 Driver
101 Communication unit
102 Signal processing unit
103 Display control unit
104 Control unit
105 Input unit
106 Output unit
107 Storage unit
111 Image processing unit
112 Detection processing unit
113 Position estimation unit
114 Distance measurement unit
115 Image recognition unit
122 Focus control unit
123 Zoom control unit
151 Display unit
201 Reset sensor

The invention claimed is:

1. An endoscope system comprising:
 a drive assembly that drives a lens;
 a measurement assembly that measures a position of the lens; and
 a control circuit that controls focusing, wherein
 the control of the focusing includes setting a control amount of wobbling at a time of the focusing on a basis of a first hysteresis that is stored and a second hysteresis that is measured upon energization.

2. The endoscope system according to claim 1, wherein the measurement assembly includes a sensor that measures the position of the lens by detecting passage of the lens.

3. The endoscope system according to claim 1, wherein the first hysteresis is a value measured at a time of manufacture.

4. The endoscope system according to claim 1, wherein the second hysteresis is measured when the lens is moved to an initial position.

5. The endoscope system according to claim 1, wherein the second hysteresis is measured during an initial operation immediately after energization.

6. The endoscope system according to claim 1, wherein the second hysteresis is measured by monitoring hysteresis applied to movement of the lens upon energization.

7. The endoscope system according to claim 1, wherein the first hysteresis and the second hysteresis are differences between a result obtained when the lens is moved to one side and a result obtained when the lens is moved to another side.

8. The endoscope system according to claim 1, wherein the control amount is a value obtained by correcting a wobbling oscillation width calculated by a predetermined algorithm using a difference between the first hysteresis and the second hysteresis as a correction amount.

9. The endoscope system according to claim 8, wherein the correction amount is a value obtained by multiplying the difference between the first hysteresis and the second hysteresis by a coefficient.

10. The endoscope system according to claim 8, wherein the predetermined algorithm calculates the wobbling oscillation width based on a contrast auto-focus evaluation value.

11. The endoscope system according to claim 1, wherein the second hysteresis is measured when a captured image is determined to be static.

12. The endoscope system according to claim 1, wherein the second hysteresis is measured when a captured image is determined to be static on a basis of a signal from an acceleration sensor.

13. The endoscope system according to claim 1, wherein in a case where a replacement timing at which a camera head including the lens is replaced is measured, the camera head is replaced with a same camera head, and at the replacement timing is less than or equal to a predetermined interval, the second hysteresis is not measured.

14. The endoscope system according to claim 1, wherein in a case where the second hysteresis is largely different from the second hysteresis measured last time, the second hysteresis is remeasured.

15. The endoscope system according to claim 1, wherein in a case where the second hysteresis is largely different from the second hysteresis measured last time, the second hysteresis measured last time is used.

16. The endoscope system according to claim 15, further comprising a display, wherein in the case where the second hysteresis is largely different from the second hysteresis measured last time, a notification is displayed on the display.

17. The endoscope system according to claim 1, wherein the first hysteresis and the second hysteresis are calculated from an angle of view of an image captured at one end and an angle of view of an image captured at another end when the lens is moved by a predetermined width.

18. The endoscope system according to claim 1, wherein the second hysteresis accounts for a change in characteristics of the drive assembly caused by autoclaving.

19. An endoscope control method of an endoscope system, the endoscope system including a drive assembly that drives a lens, a measurement assembly that measures a position of the lens, and a control circuit that controls focusing, the endoscope control method comprising:
    setting, by the control circuit, a control amount of wobbling at a time of the focusing on a basis of a first hysteresis that is stored and a second hysteresis that is measured upon energization; and
    controlling, by the control circuit, the focusing on a basis of the control amount.

20. A program for causing a computer to perform a process, the computer being configured to control an endoscope system, the endoscope system including
    a drive assembly that drives a lens,
    a measurement assembly that measures a position of the lens, and
    a control circuit that controls focusing, the process comprising:
    setting a control amount of wobbling at a time of the focusing on a basis of a first hysteresis that is stored and a second hysteresis that is measured upon energization; and
    controlling the focusing on a basis of the control amount.

* * * * *